US012451598B2

(12) United States Patent
Shin et al.

(10) Patent No.: US 12,451,598 B2
(45) Date of Patent: Oct. 21, 2025

(54) HIDDEN ANTENNA APPARATUS AND VEHICLE COMPRISING SAME

(71) Applicant: Samsung Electronics Co., Ltd., Suwon-si (KR)

(72) Inventors: Yongsun Shin, Suwon-si (KR); Jinu Kim, Suwon-si (KR); Sangbong Sung, Suwon-si (KR); Jeseung Oh, Suwon-si (KR); Dongbeom Seol, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 195 days.

(21) Appl. No.: 18/352,729

(22) Filed: Jul. 14, 2023

(65) Prior Publication Data

US 2024/0021979 A1 Jan. 18, 2024

Related U.S. Application Data

(63) Continuation of application No. PCT/KR2022/000393, filed on Jan. 10, 2022.

(30) Foreign Application Priority Data

Jan. 15, 2021 (KR) ........................ 10-2021-0006234

(51) Int. Cl.
*H01Q 1/32* (2006.01)

(52) U.S. Cl.
CPC ................................ *H01Q 1/3275* (2013.01)

(58) Field of Classification Search
CPC .......... H01Q 1/32; H01Q 1/3275; H01Q 3/30; H01Q 21/065; H01Q 21/205; H01Q 21/28
See application file for complete search history.

(56) References Cited

U.S. PATENT DOCUMENTS

| | | | |
|---|---|---|---|
| 9,899,730 | B2 | 2/2018 | Yang et al. |
| 11,342,680 | B2 | 5/2022 | Ambe et al. |
| 2017/0149130 | A1 | 5/2017 | Kim |
| 2018/0358706 | A1 | 12/2018 | Kildal et al. |
| 2019/0089419 | A1 | 3/2019 | Kim et al. |
| 2021/0305688 | A1 | 9/2021 | Kim et al. |
| 2021/0344103 | A1 | 11/2021 | Khripkov et al. |

(Continued)

FOREIGN PATENT DOCUMENTS

| | | | |
|---|---|---|---|
| CN | 207587962 | U | 7/2018 |
| JP | 2002-325009 | A | 11/2002 |

(Continued)

OTHER PUBLICATIONS

International Search Report dated Apr. 21, 2022, issued in International Patent Application No. PCT/KR2022/000393.

(Continued)

*Primary Examiner* — Hoang V Nguyen
(74) *Attorney, Agent, or Firm* — Jefferson IP Law, LLP

(57) ABSTRACT

A hidden antenna apparatus is provided. The hidden antenna apparatus includes a housing, a main board provided in the housing, a first antenna provided on the main board, a horizontal antenna substrate provided on the main board, and a second antenna mounted on the horizontal antenna substrate, wherein the main board is positioned parallel to the horizontal antenna substrate, and the second antenna is an antenna for millimeter wave (mmWave) transmission and reception.

15 Claims, 12 Drawing Sheets

(56) References Cited

U.S. PATENT DOCUMENTS

| | | | |
|---|---|---|---|
| 2021/0344107 | A1 | 11/2021 | Jeong |
| 2023/0146641 | A1 | 5/2023 | Kim et al. |

FOREIGN PATENT DOCUMENTS

| | | | | |
|---|---|---|---|---|
| KR | 10-787602 | B1 | 12/2007 | |
| KR | 101667064 | B1 * | 10/2016 | ............. G01S 7/032 |
| KR | 10-1709076 | B1 | 2/2017 | |
| KR | 10-2018-0044864 | A | 5/2018 | |
| KR | 10-1852580 | B1 | 6/2018 | |
| KR | 10-2018-0083330 | A | 7/2018 | |
| KR | 10-2020-0004870 | A | 1/2020 | |
| KR | 10-2020-0035394 | A | 4/2020 | |
| KR | 10-2341998 | B1 | 12/2021 | |
| WO | 2020/119010 | A1 | 6/2020 | |
| WO | 2020/122265 | A1 | 6/2020 | |

OTHER PUBLICATIONS

Korean Office Action dated Mar. 3, 2025, issued in Korean Patent Application No. 10-2021-0006234.

* cited by examiner

HIDDEN ANTENNA APPARATUS AND VEHICLE COMPRISING SAME

CROSS-REFERENCE TO RELATED APPLICATION(S)

This application is a continuation application, claiming priority under § 365(c), of an International application No. PCT/KR2022/000393, filed on Jan. 10, 2022, which is based on and claims the benefit of a Korean patent application number filed on Jan. 15, 2021, in the Korean Intellectual Property Office, the disclosure of which is incorporated by reference herein in its entirety.

BACKGROUND

1. Field

The disclosure relates to a hidden antenna apparatus and a vehicle including the hidden antenna apparatus.

2. Description of Related Art

Recently, demand for provision of various communication services and multimedia services to vehicles has been increasing. With the development of autonomous vehicles, there is an increasing need for communication technology that enables continuous communication with roadside infrastructure and vehicles as well as exchange or sharing of information about traffic conditions. Accordingly, multiple-input multiple-output (MIMO) communication technology for seamlessly supporting a large amount of information has been applied to vehicles, and the number of antennas that need to be mounted to a vehicle has increased significantly compared to the prior art.

Recently, issues related to mounting of millimeter wave (mmWave) antennas have also emerged. A shark-fin antenna apparatus that is an existing antenna apparatus does not have enough space to accommodate a wireless-fidelity (Wi-Fi) antenna, a Bluetooth Low Energy (BLE) antenna, a satellite digital audio radio service (SDARS) antenna, a global navigation satellite system (GNSS) antenna, a vehicle-to-everything (V2X) antenna, a remote keyless entry (RKE) antenna, and the like, as well as a long-term evolution (LTE) antenna for MIMO. Furthermore, due to its protruding structure, the shark-fin antenna apparatus is highly likely to be damaged due to an external impact.

Hidden antenna modules are being developed to overcome the limitations of the shark-fin antenna apparatus. A hidden antenna module refers to an antenna module embedded in a vehicle. A mmWave antenna deployment structure capable of performing beamforming in the zenith and azimuth directions of a vehicle is also required for a hidden antenna module to be less affected by a vehicle's metal structure (e.g., a vehicle body) and smoothly perform fifth-generation (5G) communication.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a hidden antenna apparatus having required beamforming characteristics.

Another aspect of the disclosure is to provide a vehicle including the hidden antenna apparatus having the required beamforming characteristics.

Another aspect of the disclosure is to provide a vehicle including a hidden antenna apparatus embedded in a vehicle body.

Additional aspects will be set forth in part in the description which follows and, in part, will be apparent from the description, or may be learned by practice of the presented embodiments.

In accordance with an aspect of the disclosure, an antenna apparatus is provided. The antenna apparatus includes a housing, a main board provided in the housing, a first antenna provided on the main board, a horizontal antenna substrate provided on the main board, and a second antenna mounted on the horizontal antenna substrate, wherein the main board is positioned parallel to the horizontal antenna substrate, and the second antenna is an antenna for millimeter wave (mmWave) transmission and reception.

The hidden antenna apparatus further includes a carrier substrate provided between the main board and the horizontal antenna substrate, wherein the horizontal antenna substrate is in contact with a top surface of the carrier substrate, and the carrier substrate is spaced apart from the main board along a first direction.

The hidden antenna apparatus further includes a vertical antenna substrate provided on the carrier substrate and a vertical antenna array mounted on the vertical antenna substrate, and the vertical antenna substrate may extend in the first direction.

The hidden antenna apparatus further includes a first horizontal antenna array spaced apart from the second antenna along a second direction intersecting the first direction.

The first horizontal antenna array may be mounted on the horizontal antenna substrate.

The hidden antenna apparatus further includes a first peripheral antenna substrate spaced apart from the horizontal antenna substrate along the second direction, and the first horizontal antenna array may be mounted on the first peripheral antenna substrate.

From a viewpoint based on the first direction, the first horizontal antenna array may be spaced apart from the carrier substrate.

The hidden antenna apparatus further includes a second horizontal antenna array spaced apart from the vertical antenna array with the second antenna therebetween and a third horizontal antenna array spaced apart from the first horizontal antenna array with the second antenna therebetween.

The second antenna may include a plurality of patch antennas arranged in an n×m format, and the first to third horizontal antenna arrays may each include a plurality of directional antennas.

The second antenna may be configured to perform beamforming in the range of −45 degrees (°) to +45° along a zenith direction and in the range of 0° to 360° along an azimuth direction, and the first to third horizontal antenna arrays and the vertical antenna array may be each configured to perform beamforming in the ranges of −90° to −45° and +45° to +90° along the zenith direction and in the range of 0° to 360° along the azimuth direction.

The vertical antenna substrate may be in contact with a ceiling of the housing.

The horizontal antenna substrate may be in contact with a top surface of the main board.

The second antenna may include a plurality of patch antennas arranged in an n×m format, and may be configured to perform beamforming in the range of −90° to +90° along the zenith direction and in the range of 0° to 360° along the azimuth direction.

The first antenna may include at least one of a multiple-input multiple-output (MIMO) long-term evolution (LTE) antenna supporting a fourth-generation (4G)/sub-6 gigahertz (GHz) band, a Bluetooth Low Energy (BLE)/vehicle-to-everything (V2X) antenna, a Wi-Fi antenna, a global navigation satellite system (GNSS) (L1/L2) antenna, a satellite digital audio radio service (SDARS) antenna, and a remote keyless entry (RKE) antenna.

In accordance with another aspect of the disclosure, a vehicle is provided. The vehicle includes a body and a hidden antenna apparatus embedded in the body. The hidden antenna apparatus includes a housing, a main board provided in the housing, a first antenna provided on the main board, a horizontal antenna substrate provided on the main board, and a second antenna mounted on the horizontal antenna substrate, wherein the main board is positioned parallel to the horizontal antenna substrate, and the second antenna is an antenna for mmWave transmission and reception.

A top surface of the housing may be at a level equal to or lower than a top surface of the body adjacent to the housing.

The hidden antenna apparatus further includes a carrier substrate provided between the main board and the horizontal antenna substrate, wherein the horizontal antenna substrate is in contact with a top surface of the carrier substrate, and the carrier substrate is spaced apart from the main board along a first direction.

The hidden antenna apparatus further includes a vertical antenna substrate provided on the carrier substrate and a vertical antenna array mounted on the vertical antenna substrate, and the vertical antenna substrate may extend in the first direction.

The hidden antenna apparatus further includes a first horizontal antenna array spaced apart from the second antenna along a second direction intersecting the first direction.

The horizontal antenna substrate may be in contact with a top surface of the main board.

The disclosure may provide a hidden antenna apparatus having required beamforming characteristics.

The disclosure may provide a vehicle including the hidden antenna apparatus having the required beamforming characteristics.

The disclosure may provide a vehicle including a hidden antenna apparatus that is embedded in a vehicle body.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms “a,” “an,” and “the” include plural referents unless the context clearly dictates otherwise. Thus, for example, reference to “a component surface” includes reference to one or more of such surfaces.

Furthermore, when a part “includes” or “comprises” an element, unless there is a particular description contrary thereto, the part may further include other elements, not excluding the other elements.

Furthermore, the term "unit" described in the specification refers to a unit for processing at least one function or operation.

Figure 1:
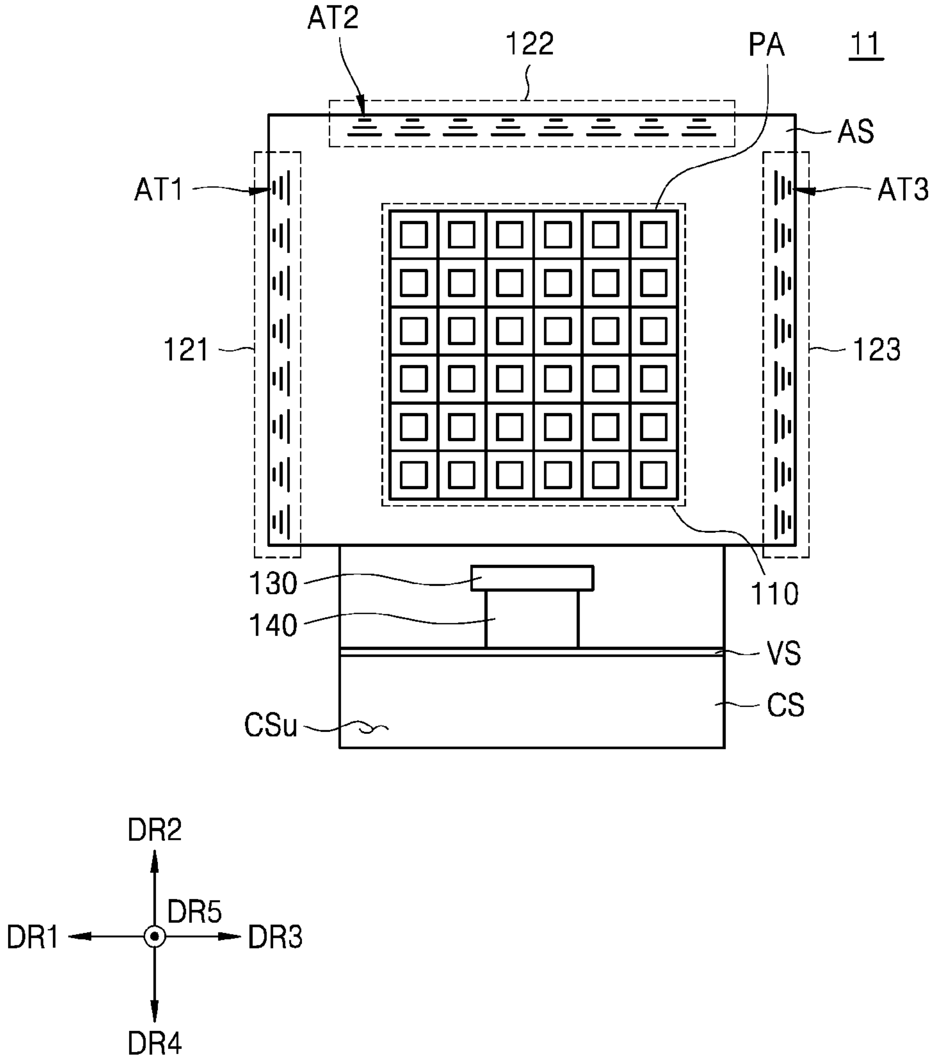
FIG. 1 is a plan view of a millimeter wave (mmWave) antenna module according to an embodiment of the disclosure.

FIG. 1 is a plan view of a millimeter wave (mmWave) antenna module according to an embodiment of the disclosure.

Figure 2:
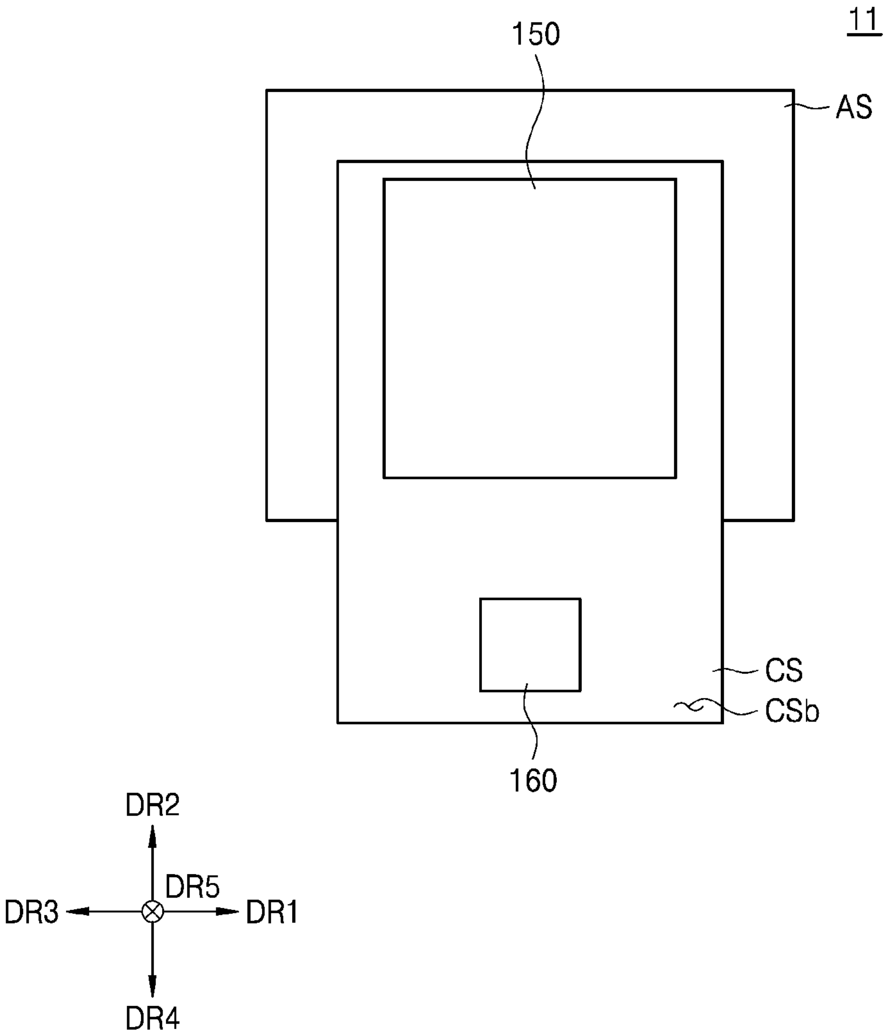
FIG. 2 is a bottom view of the mmWave antenna module of FIG. 1 according to an embodiment of the disclosure.

FIG. 2 is a bottom view of the mmWave antenna module of FIG. 1 according to an embodiment of the disclosure.

Figure 3:
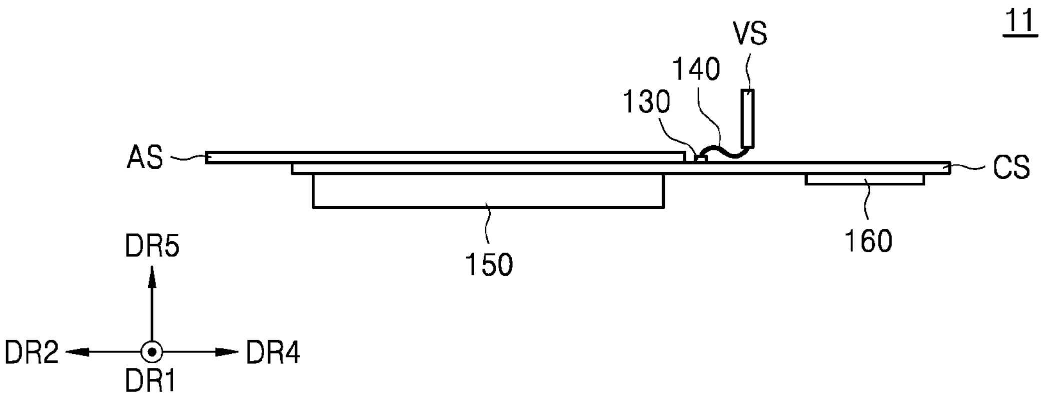
FIG. 3 is a side view of the mmWave antenna module of FIG. 1 according to an embodiment of the disclosure.

FIG. 3 is a side view of the mmWave antenna module of FIG. 1 according to an embodiment of the disclosure.

Figure 4:
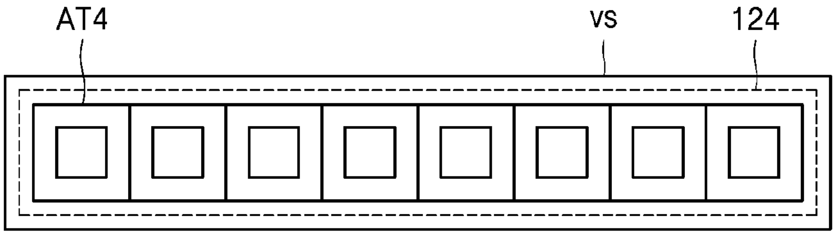
FIG. 4 is another side view of the mmWave antenna module of FIG. 1 according to an embodiment of the disclosure.

FIG. 4 illustrates a vertical antenna substrate shown in FIG. 1 according to an embodiment of the disclosure.

Figure 5:
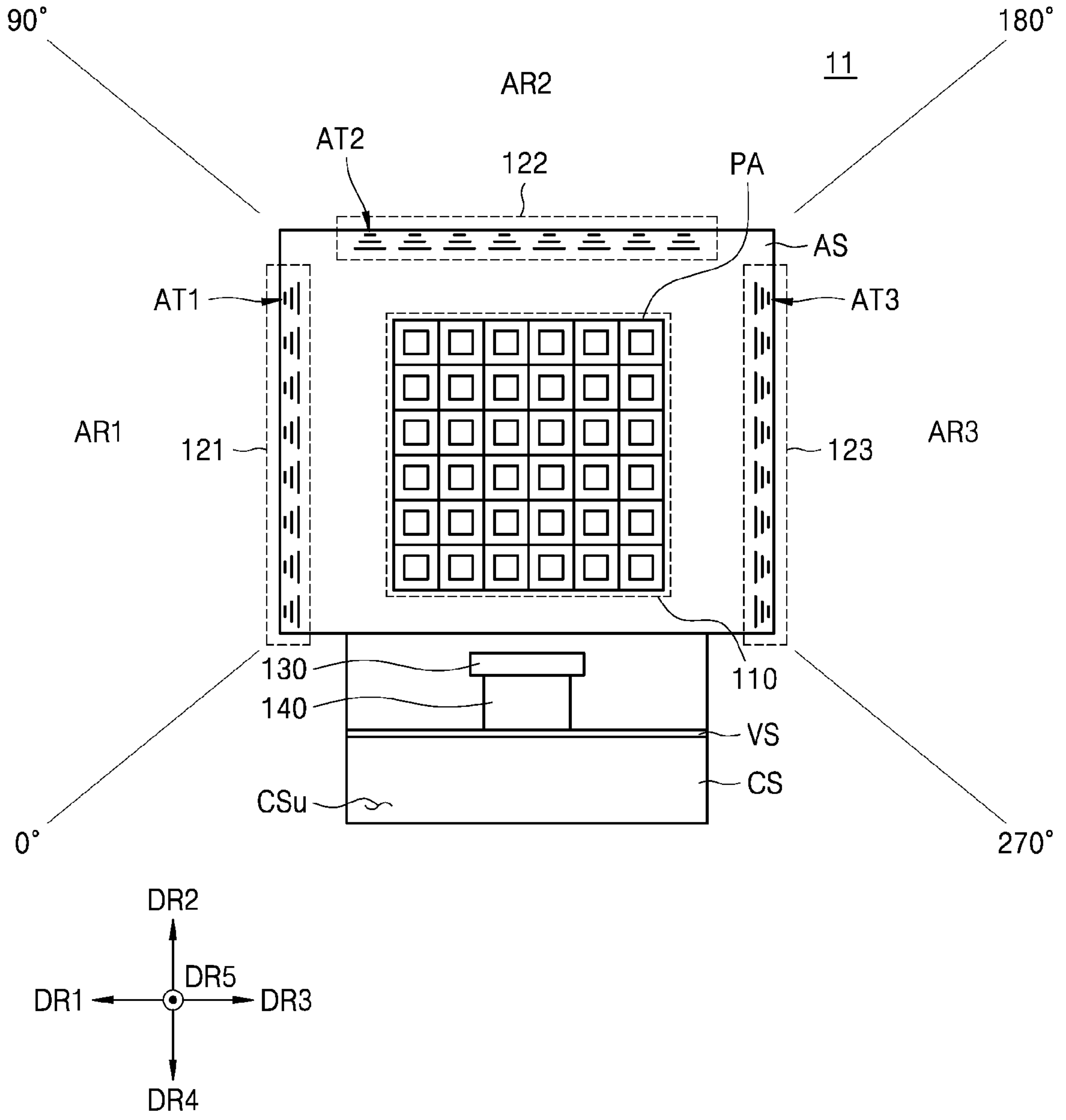
FIG. 5 is a plan view for describing a radiation pattern of the mmWave antenna module of FIG. 1 according to an embodiment of the disclosure.

FIG. 5 is a plan view for describing a radiation pattern of the mmWave antenna module 11 of FIG. 1 according to an embodiment of the disclosure.

Figure 6:
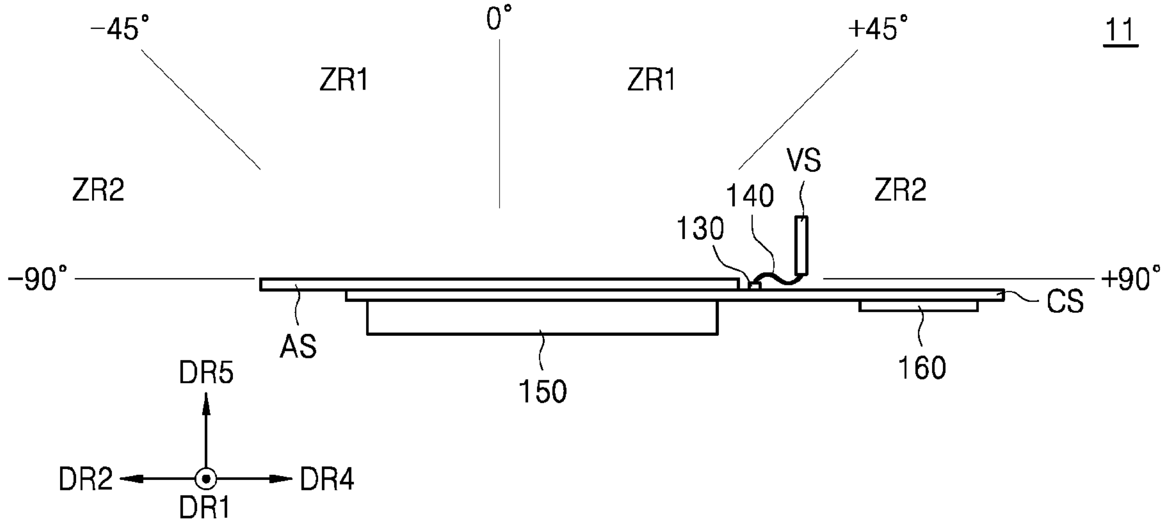
FIG. 6 is a side view for describing a radiation pattern of the mmWave antenna module of FIG. 1 according to an embodiment of the disclosure.

FIG. 6 is a side view for describing a radiation pattern of the mmWave antenna module 11 of FIG. 1 according to an embodiment of the disclosure.

Referring to FIGS. 1 to 4, a mmWave antenna module 11 may be provided. The mmWave antenna module 11 may include a carrier substrate CS, a horizontal antenna substrate AS, a vertical antenna substrate VS, radio frequency (RF) front-end circuitry 150, and an intermediate frequency chip 160. The carrier substrate CS may be a printed circuit board (PCB). The carrier substrate CS may have a flat plate shape extending in one direction. For example, the carrier substrate CS extends along a first direction DR1. The carrier substrate CS may include a top surface CSu and a bottom surface CSb opposite to the top surface CSu. Th terms 'top surface' and 'bottom surface' are used to indicate that they are different surfaces, and do not refer to surfaces oriented in specific directions (e.g., a surface oriented in a direction perpendicular to the earth's surface and a surface oriented in the opposite direction).

The horizontal antenna substrate AS may be provided on the top surface CSu of the carrier substrate CS. The horizontal antenna substrate AS may include a central antenna array 110, a first peripheral antenna array 121, a second peripheral antenna array 122, and a third peripheral antenna array 123. The central antenna array 110 may include a plurality of patch antennas PA arranged in an n×m format along the first direction DR1 and a second direction DR2 intersecting the first direction DR1. In other words, the plurality of patch antennas PA may have n rows arranged in the first direction DR1 and m columns arranged in the second direction DR2. In an embodiment, n and m may be equal to each other. For example, the central antenna array 110 may include a plurality of 36 patch antennas PA arranged in a 6×6 format.

The first to third peripheral antenna arrays 121, 122, and 123 may be arranged around the central antenna array 110. The first peripheral antenna array 121 may be spaced apart from the central antenna array 110 along the first direction DR1. From a viewpoint based on a fifth direction DR5 perpendicular to the top surface CSu of the carrier substrate CS, the first peripheral antenna array 121 may be spaced apart from the carrier substrate CS along the first direction DR1. The first peripheral antenna array 121 may include a plurality of first antennas AT1 arranged in the second direction DR2. The plurality of first antennas AT1 may include directional antennas. For example, the plurality of first antennas AT1 may be a plurality of dipole antennas or a plurality of Yagi-Uda antennas. Eight first antennas AT1 are shown, but the first peripheral antenna array 121 is not limited thereto. In another example, the first peripheral antenna array 121 may include fewer or more than eight first antennas AT1.

The second peripheral antenna array 122 may be spaced apart from the central antenna array 110 along the second direction DR2. From the viewpoint based on the fifth direction DR5, the second peripheral antenna array 122 may be spaced apart from the carrier substrate CS along the second direction DR2. The second peripheral antenna array 122 may include a plurality of second antennas AT2 arranged in the first direction DR1. The plurality of second antennas AT2 may include directional antennas. For example, the plurality of second antennas AT2 may be a plurality of dipole antennas or a plurality of Yagi-Uda antennas. Eight second antennas AT2 are shown, but the second peripheral antenna array 122 is not limited thereto. In another example, the second peripheral antenna array 122 may include fewer or more than eight second antennas AT2.

The third peripheral antenna array 123 may be spaced apart from the central antenna array 110 along a third direction DR3. The third direction DR3 may be an opposite to the first direction DR1. From the viewpoint based on the fifth direction DR5, the third peripheral antenna array 123 may be spaced apart from the carrier substrate CS along the third direction DR3. The third peripheral antenna array 123 may include a plurality of third antennas AT3 arranged along the second direction DR2. The plurality of third antennas AT3 may include directional antennas. For example, the plurality of third antennas AT3 may be a plurality of dipole antennas or a plurality of Yagi-Uda antennas. Eight (8) third antennas AT3 are shown, but the third peripheral antenna array 123 is not limited thereto. In another example, the third peripheral antenna array 123 may include fewer or more than eight third antennas AT3.

The vertical antenna substrate VS may be provided on the top surface CSu of the carrier substrate CS. The vertical antenna substrate VS may be spaced apart from the horizontal antenna substrate AS along a fourth direction DR4. The fourth direction DR4 may be opposite to the second direction DR2. The vertical antenna substrate VS may extend in a direction intersecting the top surface CSu of the carrier substrate CS. For example, the vertical antenna substrate VS extends in the fifth direction DR5 perpendicular to the top surface CSu of the carrier substrate CS. However, the direction in which the vertical antenna substrate VS extends is not limited to the fifth direction DR5. In another example, an angle of intersection between the direction in which the vertical antenna substrate VS extends and the top surface CSu of the carrier substrate CS may be greater than or less than 90°.

The vertical antenna substrate VS may include a fourth peripheral antenna array 124. For example, the fourth peripheral antenna array 124 is provided on a surface of the vertical antenna substrate VS oriented in the fourth direction DR4. The fourth peripheral antenna array 124 may overlap the carrier substrate CS along the fifth direction DR5. The fourth peripheral antenna array 124 may include a plurality of fourth antennas AT4 arranged in the first direction DR1. The plurality of fourth antennas AT4 may include directional antennas. For example, the plurality of fourth antennas AT4 are a plurality of patch antennas, a plurality of dipole antennas, or a plurality of Yagi-Uda antennas. Eight fourth antennas AT4 are shown, but the fourth peripheral antenna array is not limited thereto. In another example, the fourth peripheral antenna array 124 includes fewer or more than eight fourth antennas AT4.

A connector 130 and a flexible PCB (FPCB) 140 may be provided between the horizontal antenna substrate AS and the vertical antenna substrate VS. The vertical antenna substrate VS may be electrically connected to the carrier substrate CS via the connector 130 and the FPCB 140. The connector 130 may contact the top surface CSu of the carrier substrate CS. The FPCB 140 may electrically connect the connector 130 to the vertical antenna substrate VS.

The RF front-end circuitry 150 and the intermediate frequency chip 160 may be provided on the bottom surface CSb of the carrier substrate CS. The RF front-end circuitry 150 may be disposed opposite to the horizontal antenna substrate AS with the carrier substrate CS therebetween. For example, the RF front-end circuitry 150 overlaps the horizontal antenna substrate AS along the fifth direction DR5. The intermediate frequency chip 160 may be spaced apart from the RF front-end circuitry 150 along the fourth direction DR4. From the viewpoint based on the fifth direction DR5, the intermediate frequency chip 160 may be spaced apart from the vertical antenna substrate VS along the fourth direction DR4.

The RF front-end circuitry 150 may process signals received from the outside or signals transmitted to the outside. The signals received from the outside may be electrical signals generated by the central antenna array 110 and the first to fourth peripheral antenna arrays 121, 122, 123, and 124 receiving RF signals. The signals transmitted to the outside may be electrical signals that are provided to the central antenna array 110 and the first to fourth peripheral antenna arrays 121, 122, 123, and 124 and then converted into RF signals. For example, the RF front-end circuitry 150 includes a low noise amplifier, a power amplifier, and a phase shifter.

The low-noise amplifier may low-noise amplify signals received via the central antenna array 110 and the first to fourth peripheral antenna arrays 121, 122, 123, and 124, and transmit the amplified signals to the intermediate frequency chip 160. The intermediate frequency chip 160 may modulate the amplified signals from an RF band to an intermediate frequency band. For example, the intermediate frequency chip 160 converts the amplified signals from a 28 gigahertz (GHz) band to a 10.6 GHz band. On the other hand, the intermediate frequency chip 160 may convert an intermediate frequency band signal into an RF band signal.

The power amplifier may amplify signals from the intermediate frequency chip 160 to produce higher power signals. The power amplifier may provide the amplified signals to the central antenna array 110 and the first to fourth peripheral antenna arrays 121, 122, 123, and 124.

The phase shifter controls operating phases of the central antenna array 110 and the plurality of antennas AT1, AT2, AT3, and AT4 respectively in the first to fourth peripheral antenna arrays 121, 122, 123, and 124. Accordingly, beamforming may be performed on a beam emitted by each of the central antenna array 110 and the first to fourth peripheral antenna arrays 121, 122, 123, and 124.

Referring to FIG. 5, the first peripheral antenna array 121 may transmit and receive RF signals over a range of a first horizontal radiation region AR1. In other words, the first peripheral antenna array 121 may receive an RF signal incident on the first peripheral antenna array 121 through the first horizontal radiation region AR1, and transmit an RF signal to the outside of the mmWave antenna module 11 through the first horizontal radiation region AR1. For example, the first horizontal radiation region AR1 a region having an azimuth angle range of 90 degrees)(°. For convenience of description, in FIG. 5, the first horizontal radiation region AR1 is shown as a region corresponding to a range of 0° to 90° along an azimuth direction. The first peripheral antenna array 121 may perform beamforming within the area corresponding to 0° to 90° along the azimuth direction (i.e., the first horizontal radiation region AR1).

The second peripheral antenna array 122 may transmit and receive RF signals over a range of a second horizontal radiation region AR2. In other words, the second peripheral antenna array 122 may receive an RF signal incident on the second peripheral antenna array 122 through the second horizontal radiation region AR2, and transmit an RF signal to the outside of the mmWave antenna module 11 through the second horizontal radiation region AR2. For example, the second horizontal radiation region AR2 is a region having an azimuth angle range of 90°. For convenience of description, in FIG. 5, the second horizontal radiation region AR2 is shown as a region corresponding to a range of 90° to 180° along the azimuth direction. The second peripheral antenna array 122 may perform beamforming within the range of 90° to 180° along the azimuth direction (i.e., the second horizontal radiation region AR2).

The third peripheral antenna array 123 may transmit and receive RF signals over a range of a third horizontal radiation region AR3. In other words, the third peripheral antenna array 123 may receive an RF signal incident on the third peripheral antenna array 123 through the third horizontal radiation region AR3, and transmit an RF signal to the outside of the mmWave antenna module 11 through the third horizontal radiation region AR3. For example, the third horizontal radiation region AR3 is a region having an azimuth angle range of 90°. For convenience of description, in FIG. 5, the third horizontal radiation region AR3 is shown as a region corresponding to a range of 180° to 270° along the azimuth direction. The third peripheral antenna array 123 may perform beamforming within the range of 180° to 270° along the azimuth direction (i.e., the third horizontal radiation region AR3).

The fourth peripheral antenna array 124 may transmit and receive RF signals over a range of a fourth horizontal radiation region AR4. In other words, the fourth peripheral antenna array 124 may receive an RF signal incident on the fourth peripheral antenna array 124 through the third horizontal radiation region AR4, and transmit an RF signal to the outside of the mmWave antenna module 11 through the fourth horizontal radiation region AR4. For example, the fourth horizontal radiation region AR4 is a region having an azimuth angle range of 90°. For convenience of description, in FIG. 5, the fourth horizontal radiation region AR4 is shown as a region corresponding to a range of 270° to 360° (i.e., 0°) along the azimuth direction. The fourth peripheral antenna array 124 may perform beamforming within the range of 270° to 360° along the azimuth direction (i.e., the fourth horizontal radiation region AR4).

Referring to FIG. 6, the central antenna array 110 may transmit and receive RF signals over a range of a first vertical radiation region ZR1. In other words, the central antenna array 110 may receive an RF signal incident on the central antenna array 110 through the first vertical radiation region ZR1, and transmit an RF signal to the outside of the mmWave antenna module 11 through the first vertical radiation region ZR1. For example, the first vertical radiation region ZR1 is a region having a zenith angle range of −45° to +45°. For example, the central antenna array 110 adjusts phases of patch antennas to perform beamforming within the range of −45° to +45° along a zenith direction (i.e., the first vertical radiation region ZR1).

The first to fourth peripheral antenna arrays 121, 122, 123, and 124 may each transmit and receive RF signals over a range of a second vertical radiation region ZR2. In other words, the first to fourth peripheral antenna arrays 121, 122, 123, and 124 may each receive an RF signal incident thereon through the second vertical radiation region ZR2, and transmit an RF signal to the outside of the mmWave antenna module 11 through the second vertical radiation region ZR2. For example, the second vertical radiation region ZR2 is a region having a zenith angle range of +45° to +90° and −90° to −45°. For example, the first to fourth peripheral antenna arrays 121, 122, 123, and 124 each perform beamforming within the range of +45° to +90° and −90° to −45° along the zenith direction (i.e., the second vertical radiation region ZR2).

Division of the zenith angle into positive and negative angle parts as described above is for clarity of description. The zenith angle does not refer only to the angle in FIG. 6. The zenith angle may be an angle that is divided into parts based on 0° in any cross-section along the fifth direction DR5.

MmWave beamforming is required to be performed in the range between −90° and +90° along the zenith direction and in the range between 0° and 360° along the azimuth direction. The disclosure may provide the mmWave antenna module 11 that performs beamforming in the range of −90° to +90° along the zenith direction and in the range of 0° to 360° along the azimuth direction. Accordingly, the mmWave antenna module 11 having required beamforming characteristics may be provided.

Figure 7:
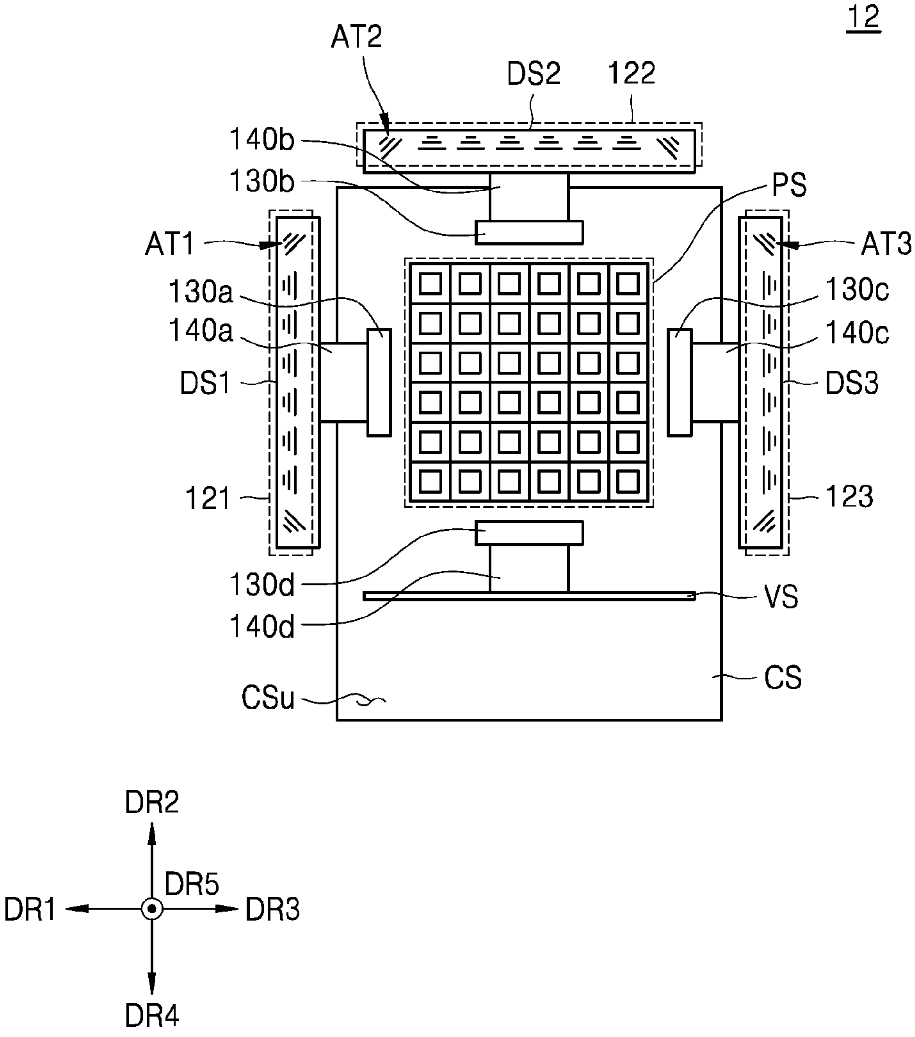
FIG. 7 is a plan view of an mmWave antenna module according to an embodiment of the disclosure.

FIG. 7 is a plan view of an mmWave antenna module 12 according to an embodiment of the disclosure. For brevity of description, descriptions that are substantially the same as the descriptions with reference to FIGS. 1 to 6 may not be provided.

Referring to FIG. 7, the mmWave antenna module 12 may include a carrier substrate CS, a horizontal antenna substrate CS, a first peripheral antenna substrate DS1, a second peripheral antenna substrate DS2, and a third peripheral antenna substrate DS3, a vertical antenna substrate VS, RF front-end circuitry 150, and an intermediate frequency chip 160. The carrier substrate CS, the vertical antenna substrate VS, the RF front-end circuitry 150, and the intermediate frequency chip 160 may be respectively substantially the same as the carrier substrate CS, the vertical antenna substrate, the RF front-end circuitry 150, and the intermediate frequency chip 160 described with reference to FIGS. 1 to 4.

The horizontal antenna substrate CS may be provided on a top surface CSu of the carrier substrate CS. The horizontal antenna substrate CS may cover a portion of the top surface CSu of the carrier substrate CS. The other portion of the top surface CSu of the carrier substrate CS may be exposed by the horizontal antenna substrate CS. The horizontal antenna substrate CS may include the central antenna array 110. The central antenna array 110 may be substantially the same as that described with reference to FIGS. 1 to 4.

The first peripheral antenna substrate DS1 may be spaced apart from the horizontal antenna substrate CS in the first direction DR1. For example, the top surface CSu of the carrier substrate CS is exposed between the first peripheral antenna substrate DS1 and the horizontal antenna substrate CS. From a viewpoint based on the fifth direction DR5, the first peripheral antenna substrate DS1 may be spaced apart from the carrier substrate CS along the first direction DR1. The first peripheral antenna substrate DS1 may include a first peripheral antenna array 121. The first peripheral antenna array 121 may be substantially the same as that described with reference to FIGS. 1 to 4.

A first connector 130*a* and a first FPCB 140*a* may be provided between the first peripheral antenna substrate DS1 and the horizontal antenna substrate CS. The first peripheral antenna substrate DS1 may be electrically connected to the carrier substrate CS by the first connector 130*a* and the first FPCB 140*a*. The first connector 130*a* may be provided on the top surface CSu of the carrier substrate CS exposed between the first peripheral antenna substrate DS1 and the horizontal antenna substrate CS. For example, the first connector 130*a* contacts the top surface CSu of the carrier substrate CS. The first FPCB 140*a* may electrically connect the first connector 130*a* to the first peripheral antenna substrate DS1.

The second peripheral antenna substrate DS2 may be spaced apart from the horizontal antenna substrate CS in the second direction DR2. For example, the top surface CSu of the carrier substrate CS is exposed between the second peripheral antenna substrate DS2 and the horizontal antenna substrate CS. From the viewpoint based on the fifth direction DR5, the second peripheral antenna substrate DS2 may be spaced apart from the carrier substrate CS along the second direction DR2. The second peripheral antenna substrate DS2 may include the second peripheral antenna array 122. The second peripheral antenna array 122 may be substantially the same as that described with reference to FIGS. 1 to 4.

A second connector 130*b* and a second FPCB 140*b* may be provided between the second peripheral antenna substrate DS2 and the horizontal antenna substrate CS. The second peripheral antenna substrate DS2 may be electrically connected to the carrier substrate CS by the second connector 130*b* and the second FPCB 140*b*. The second connector 130*b* may be provided on the top surface CSu of the carrier substrate CS exposed between the second peripheral antenna substrate DS2 and the horizontal antenna substrate CS. For example, the second connector 130*b* contacts the top surface CSu of the carrier substrate CS. The second FPCB 140*b* may electrically connect the second connector 130*b* to the second peripheral antenna substrate DS2.

The third peripheral antenna substrate DS3 may be spaced apart from the horizontal antenna substrate CS in the third direction DR3. For example, the top surface CSu of the carrier substrate CS is exposed between the third peripheral antenna substrate DS3 and the horizontal antenna substrate CS. From the viewpoint based on the fifth direction DR5, the third peripheral antenna substrate DS3 may be spaced apart from the carrier substrate CS along the third direction DR3. The third peripheral antenna substrate DS3 may include a third peripheral antenna array 123. The third peripheral antenna array 123 may be substantially the same as that described with reference to FIGS. 1 to 4.

A third connector 130*c* and a third FPCB 140*c* may be provided between the third peripheral antenna substrate DS3 and the horizontal antenna substrate CS. The third peripheral antenna substrate DS3 may be electrically connected to the carrier substrate CS by the third connector 130*c* and the third FPCB 140*c*. The third connector 130*c* may be provided on the top surface CSu of the carrier substrate CS exposed between the third peripheral antenna substrate DS3 and the horizontal antenna substrate CS. For example, the third connector 130*c* contacts the top surface CSu of the carrier substrate CS. The third FPCB 140*c* may electrically connect the third connector 130*c* to the third peripheral antenna substrate DS3.

The vertical antenna substrate VS may be electrically connected to the carrier substrate CS by a fourth connector 130*d* and a fourth FPCB 140*d*. The fourth connector 130*d* and the fourth FPCB 140*d* may be respectively substantially the same as the connector 130 and the FPCB 140 described with reference to FIGS. 1 to 4.

The disclosure may provide the mmWave antenna module 12 that performs beamforming in the range of −90° to +90° along the zenith direction and in the range of 0° to 360° along the azimuth direction. Accordingly, the mmWave antenna module 12 having required beamforming characteristics may be provided.

Figure 8:
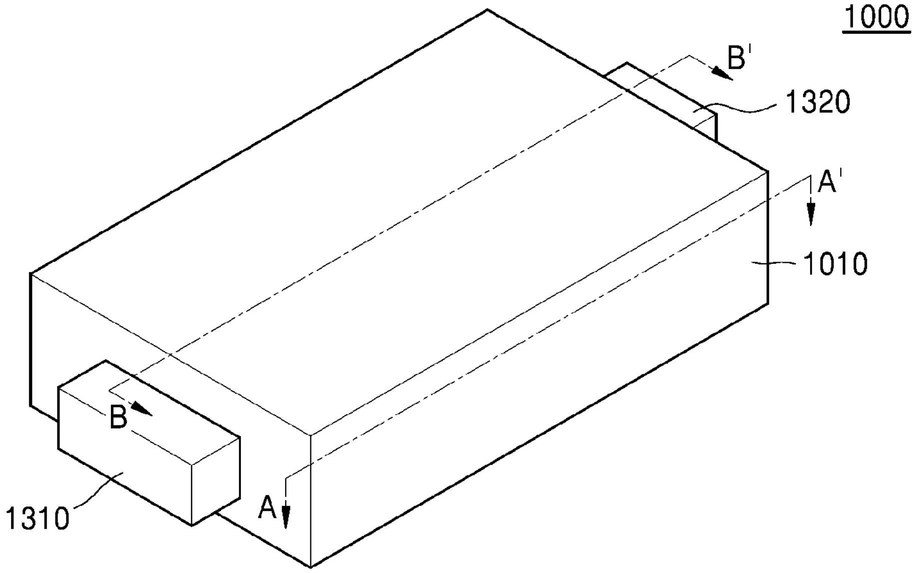
FIG. 8 is a perspective view of an antenna apparatus according to an embodiment of the disclosure.

FIG. 8 is a perspective view of an antenna apparatus 1000 according to an embodiment of the disclosure.

Figure 9:
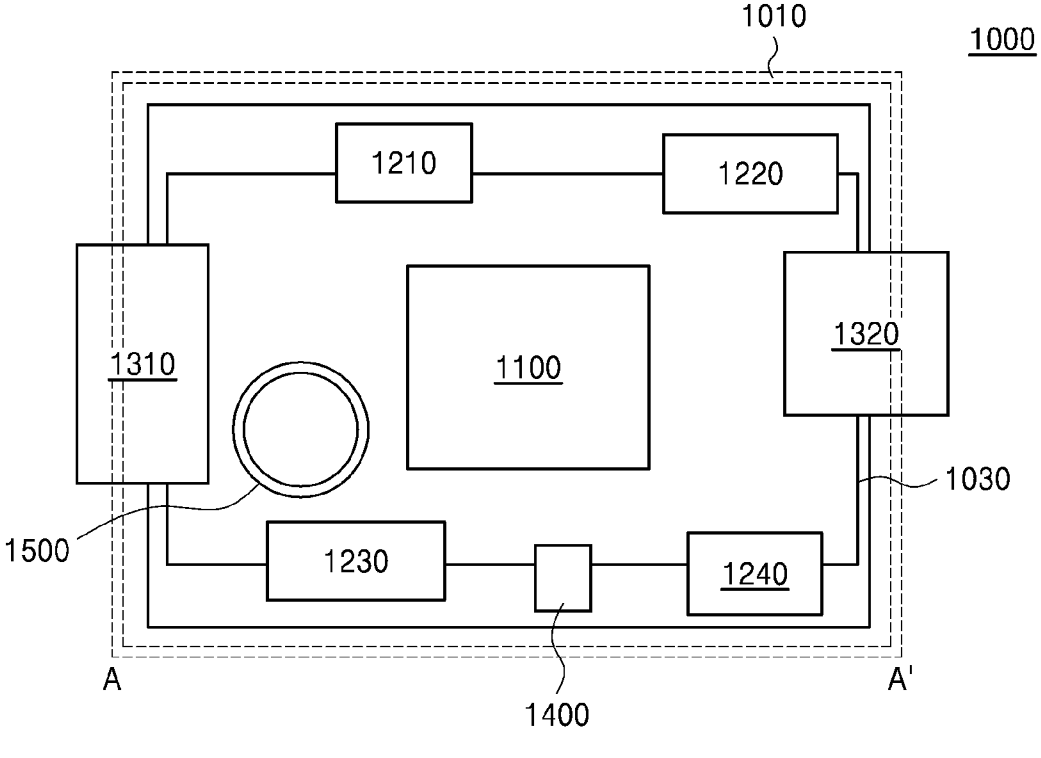
FIG. 9 is a cross-sectional view taken along a line A-A' of FIG. 8 according to an embodiment of the disclosure.

FIG. 9 is a cross-sectional view taken along a line A-A' of FIG. 8 according to an embodiment of the disclosure.

Figure 10:
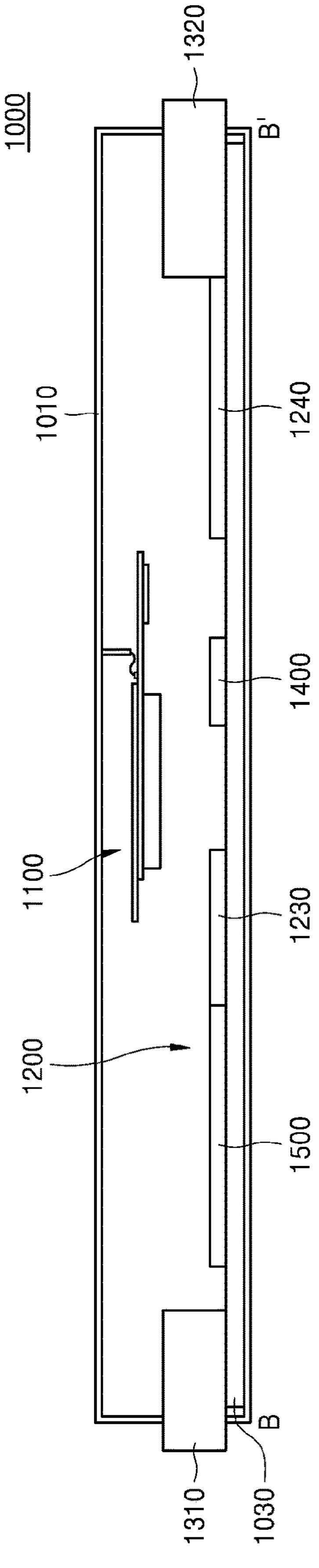
FIG. 10 is a cross-sectional view taken along a line B-B' of FIG. 8 according to an embodiment of the disclosure.

FIG. 10 is a cross-sectional view taken along a line B-B' of FIG. 8 according to an embodiment of the disclosure. For brevity of description, descriptions that are substantially the same as the descriptions with reference to FIGS. 1 to 6 may not be repeated.

Referring to FIGS. 8 to 10, the antenna apparatus 1000 may be provided. The antenna apparatus 1000 may be a hidden antenna apparatus. The antenna apparatus 1000 may include a casing 1010, a first antenna module 1100, a second antenna module 1200, a first connector 1310, and a second connector 1320. The casing 1010 may define an inner space for accommodating the first antenna module 1100, the second antenna module 1200, the first connector 1310, and the second connector 1320. The casing 1010 may have a rigid material. Therefore, the casing 1010 may protect the first antenna module 1100, the second antenna module 1200, the first connector 1310, and the second connector 1320.

The first antenna module 1100 may be substantially the same as the mmWave antenna module 11 or 12 described with reference to FIG. 1 to 4 or 7. The first antenna module 1100 may be disposed at a top portion of the inner space of the casing 1010. The first antenna module 1100 may be positioned in close contact with a ceiling of the inner space of the casing 1010. For example, the vertical antenna substrate (VS of FIG. 1 to 4 or 7) is in contact with the ceiling of the inner space of the casing 1010. In an example, a position of the first antenna module 1100 is fixed by a separate fixing member (not shown) connected to the casing 1010.

The second antenna module 1200 may be disposed at a bottom portion of the inner space of the casing 1010. The second antenna module 1200 may include a main board 1030 and antennas 1210, 1220, 1230, 1240, 1400, and 1500. As an example, the antennas includes LTE antennas 1210, 1220, 1230 and 1240 for LTE communication services, a BLE/V2X antenna 1400 for Bluetooth communication and V2X communication, and an L1/L2 antenna 1500 for receiving global positioning system (GPS) signals. Positions of the LTE antennas 1210, 1220, 1230, and 1240, the BLE/V2X antenna 1400, and the L1/L2 antenna 1500 are not limited to those shown. The positions of the LTE antennas 1210, 1220, 1230, and 1240, the BLE/V2X antenna 1400, and the L1/L2 antenna 1500 may be determined as needed. In an example, each of the LTE antennas 1210, 1220, 1230, and 1240 are a multiple-input multiple-output (MIMO) LTE antenna supporting a fourth-generation (4G)/sub-6 GHz band. In an example, the second antenna module 1200 further includes at least one of a Wi-Fi antenna, a SDARS antenna, and an RKE antenna.

The first connector 1310 and the second connector 1320 may respectively pass through a pair of sidewalls located on opposite sides of the casing 1010. The first connector 1310 and the second connector 1320 may electrically connect the first antenna module 1100 and the second antenna module 1200 to an external device of the antenna apparatus 1000. For example, the external device processes signals generated by the first antenna module 1100 and the second antenna module 1200 and transmits control signals to the first antenna module 1100 and the second antenna module 1200.

The disclosure may provide the antenna apparatus 1000 including the mmWave antenna module 11 or 12 that performs beamforming in the range of −90° to +90° along the zenith direction and in the range of 0° to 360° along the azimuth direction. Accordingly, the antenna apparatus 1000 including the mmWave antenna module 11 or 12 having required beamforming characteristics may be provided.

Figure 11:
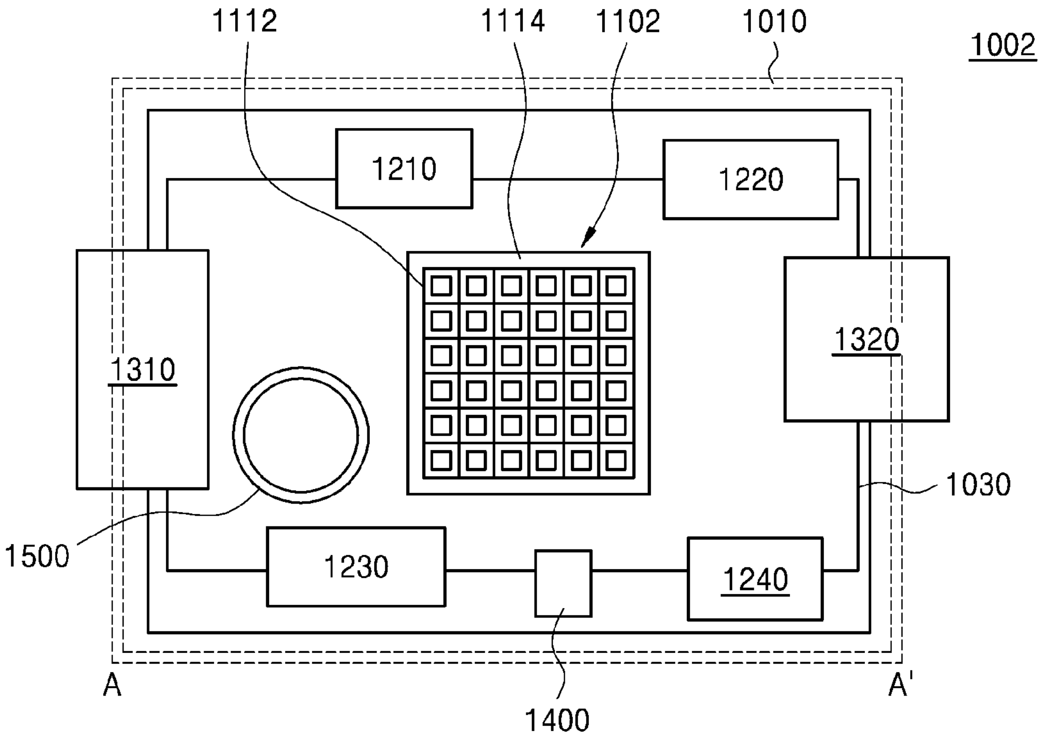
FIG. 11 is a cross-sectional view, corresponding to the line A-A' of FIG. 8, for describing an antenna apparatus according to an embodiment of the disclosure.

FIG. 11 is a cross-sectional view, corresponding to the line A-A' of FIG. 8, for describing an antenna apparatus 1002 according to an embodiment of the disclosure.

Figure 12:
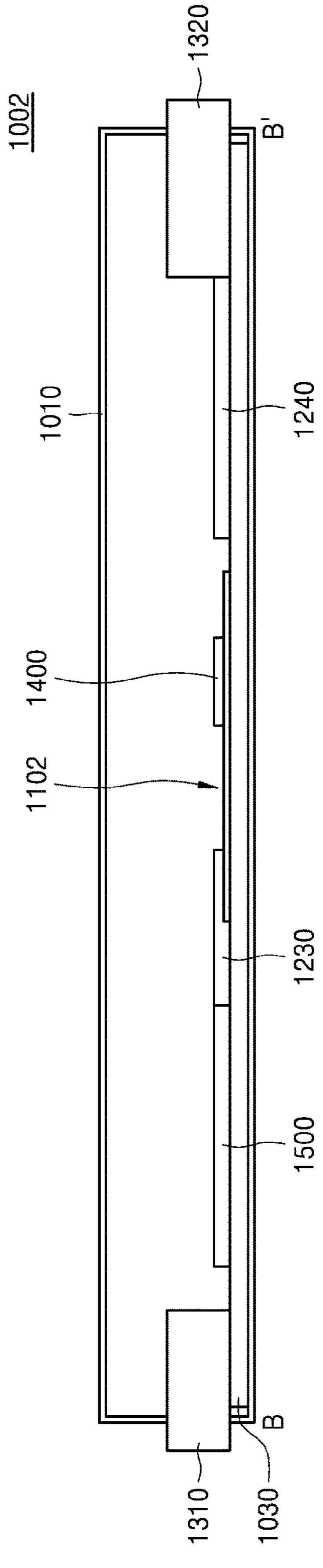
FIG. 12 is a cross-sectional view, corresponding to the line B-B' of FIG. 8, for describing the antenna apparatus of FIG. 11 according to an embodiment of the disclosure.

FIG. 12 is a cross-sectional view, corresponding to the line B-B' of FIG. 8, for describing the antenna apparatus 1002 of FIG. 11 according to an embodiment of the disclosure. For brevity of description, descriptions that are substantially the same as the descriptions with reference to FIGS. 8 to 10 may not be provided.

Referring to FIGS. 11 and 12, the antenna apparatus 1002 may be provided. The antenna apparatus 1002 may be a hidden antenna apparatus. The antenna apparatus 1002 may include a casing 1010, a third antenna module 1102, a second antenna module 1200, a first connector 1310, and a second connector 1320. The casing 1010, the second antenna module 1200, the first connector 1310, and the second connector 1320 may be substantially the same as those described with reference to FIGS. 8 to 10.

The third antenna module 1102 may be a PCB substrate 1114 including a plurality of patch antennas 1112. The third antenna module 1102 may contact a top surface of a lower substrate (i.e., main board 1030). For example, the third antenna module 1102 is coupled to the lower substrate (i.e., main board 1030).

The plurality of patch antennas 1112 may perform beamforming in the range of −90° to +90° along the zenith direction and in the range of 0° to 360° along the azimuth direction. For example, phases of the plurality of patch antennas 1112 are adjusted to perform beamforming.

Figure 13:
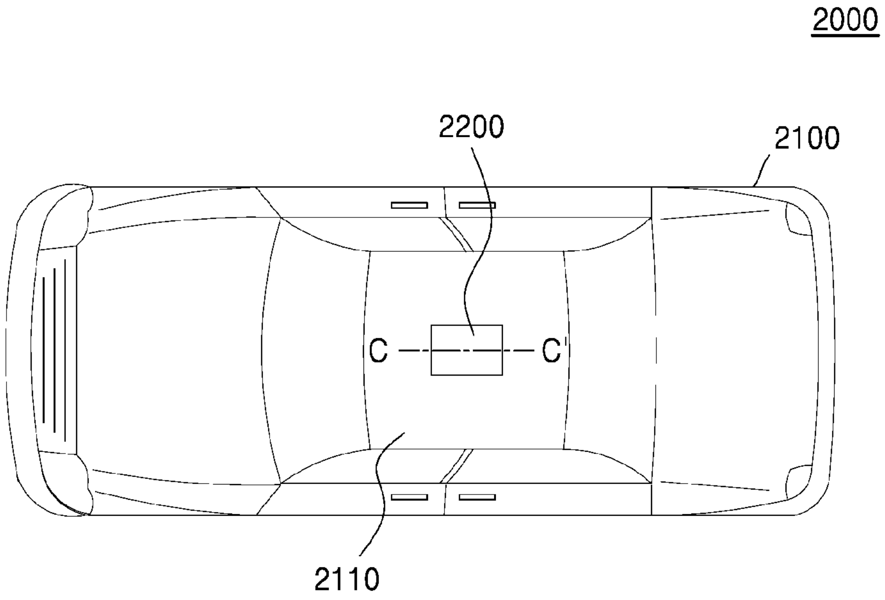
FIG. 13 is a plan view of a vehicle according to an embodiment of the disclosure.

FIG. 13 is a plan view of a vehicle according to an embodiment of the disclosure.

Figure 14:
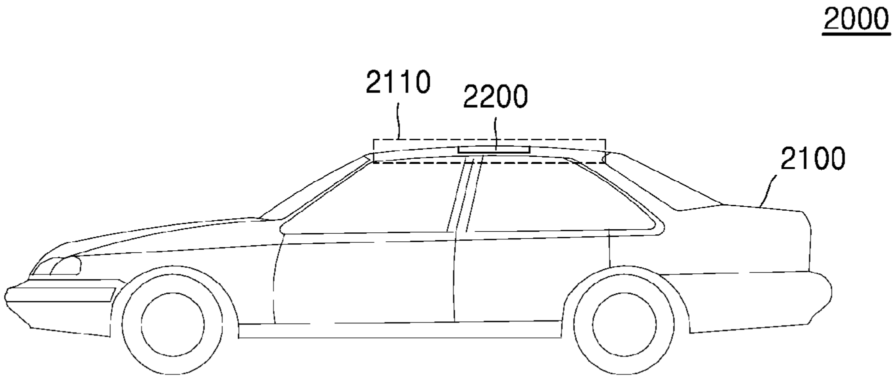
FIG. 14 is a side view of the vehicle of FIG. 13 according to an embodiment of the disclosure.

FIG. 14 is a side view of the vehicle of FIG. 13 according to an embodiment of the disclosure.

Figure 15:
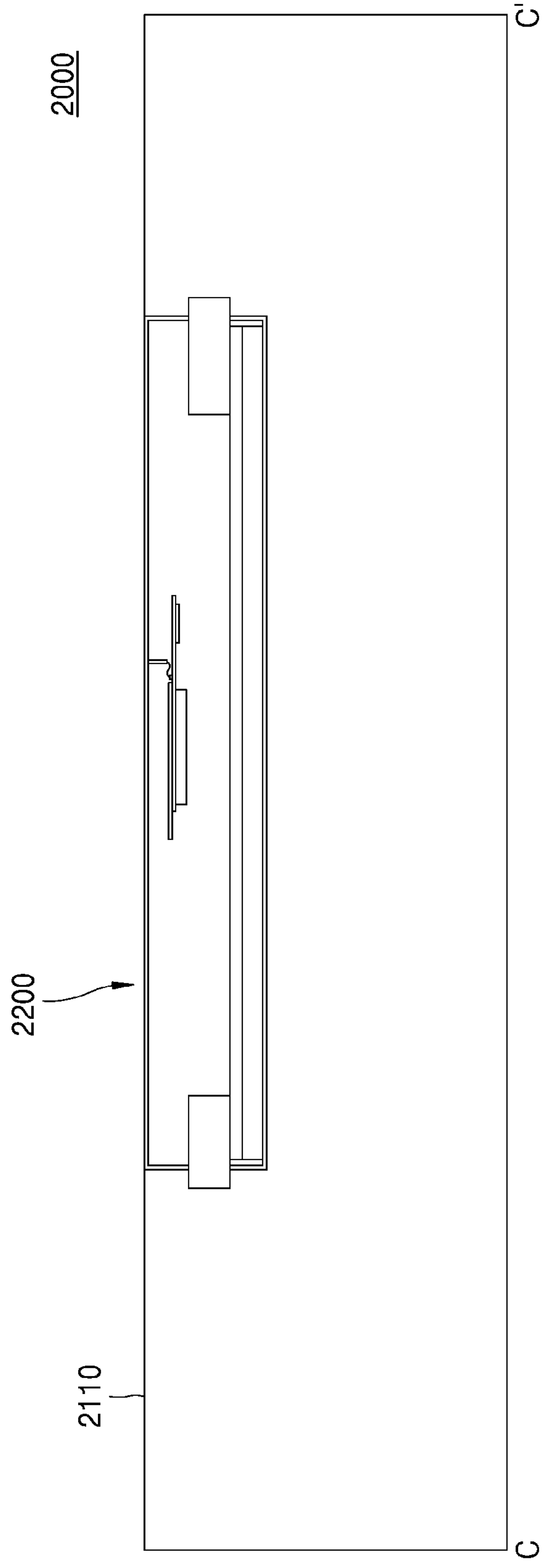
FIG. 15 is a cross-sectional view taken along a line C-C' of FIG. 13 according to an embodiment of the disclosure.

FIG. 15 is a cross-sectional view taken along a line C-C' of FIG. 13 according to an embodiment of the disclosure. For brevity of description, descriptions that are substantially the same as the above descriptions may not be provided.

Referring to FIGS. 13 and 14, a vehicle 2000 may be provided. The vehicle 2000 of the disclosure may be any means of transportation in which the antenna apparatus 2200 is inserted into a body 2100 thereof. Although the vehicle 2000 is shown as a passenger car, this is merely an example. The vehicle 2000 may include a body 2100 having a roof 2110. The roof 2110 of the body 2100 may include metal.

Referring to FIG. 15, the antenna apparatus 2200 may be embedded in the roof 2110. The antenna apparatus 2200 may be a hidden antenna apparatus. The antenna apparatus 2200 may be the antenna apparatus 1000 described with reference to FIGS. 8 to 10 or the antenna apparatus 1002 described with reference to FIGS. 11 and 12. A top surface of the antenna apparatus 2200 may be at a level equal to or lower than a top surface of the body 2100. For example, the top surface of the antenna apparatus 2200 is coplanar with the top surface of the roof 2110. For a shark-fin antenna apparatus, it protrudes from the top surface of the roof of the body. As a result, the shark-fin antenna apparatus may be damaged. The antenna apparatus 2200 of the disclosure may not protrude from the top surface of the roof 2110. Accordingly, the antenna apparatus 2200 may be less likely to be damaged during use.

The disclosure may provide the vehicle 2000 including the antenna apparatus 2200 that performs beamforming in the range of −90° to +90° along the zenith direction. The disclosure may provide the vehicle 2000 including the antenna apparatus 2200 that performs beamforming in the range of 0° to 360° along the azimuth direction. Accordingly, the vehicle 2000 including the antenna apparatus 2200 having required beamforming characteristics may be provided. The disclosure may provide the vehicle 2000 including the antenna apparatus 2200 embedded in the body 2100.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A hidden antenna apparatus comprising:
- a housing;
- a main board provided in the housing;
- a first antenna provided on an upper surface of the main board;
- a horizontal antenna substrate provided on a lower surface of the main board; and
- a second antenna mounted on a lower surface of the horizontal antenna substrate,
- wherein the main board is positioned parallel to and overlapping the horizontal antenna substrate, and
- wherein the second antenna is an antenna for millimeter wave (mmWave) transmission and reception.

2. The hidden antenna apparatus of claim 1, further comprising:
- a carrier substrate provided between the main board and the horizontal antenna substrate,
- wherein the horizontal antenna substrate is in contact with a top surface of the carrier substrate, and
- wherein the carrier substrate is spaced apart from the main board along a first direction.

3. The hidden antenna apparatus of claim 2, further comprising:
- a vertical antenna substrate provided on the carrier substrate; and
- a vertical antenna array mounted on the vertical antenna substrate,
- wherein the vertical antenna substrate extends in the first direction.

4. The hidden antenna apparatus of claim 3, further comprising:
- a first horizontal antenna array spaced apart from the second antenna along a second direction intersecting the first direction.

5. The hidden antenna apparatus of claim 4, wherein the first horizontal antenna array is mounted on the horizontal antenna substrate.

6. The hidden antenna apparatus of claim 4, further comprising:
- a first peripheral antenna substrate spaced apart from the horizontal antenna substrate along the second direction,
- wherein the first horizontal antenna array is mounted on the first peripheral antenna substrate.

7. The hidden antenna apparatus of claim 4, wherein from a viewpoint based on the first direction, the first horizontal antenna array is spaced apart from the carrier substrate.

8. The hidden antenna apparatus of claim 4, further comprising:
- a second horizontal antenna array spaced apart from the vertical antenna array with the second antenna therebetween; and
- a third horizontal antenna array spaced apart from the first horizontal antenna array with the second antenna therebetween.

9. The hidden antenna apparatus of claim 3, wherein the vertical antenna substrate is in contact with a ceiling of the housing.

10. The hidden antenna apparatus of claim 1, wherein the horizontal antenna substrate is in contact with a top surface of the main board.

11. The hidden antenna apparatus of claim 1, wherein the first antenna comprises at least one of:
- a multiple-input multiple-output (MIMO) long-term evolution (LTE) antenna supporting a fourth-generation (4G)/sub-6 GHz band,
- a Bluetooth Low Energy (BLE)/vehicle-to-everything (V2X) antenna,
- a Wi-Fi antenna, a global navigation satellite system (GNSS) (L1/L2) antenna,
- a satellite digital audio radio service (SDARS) antenna, and
- a remote keyless entry (RKE) antenna.

12. A vehicle comprising:
- a body; and
- a hidden antenna apparatus embedded in the body,
- wherein the hidden antenna apparatus comprises:
  - a housing,
  - a main board provided in the housing,
  - a first antenna provided on an upper surface of the main board,
  - a horizontal antenna substrate provided on a lower surface of the main board, and
  - a second antenna mounted on a lower surface of the horizontal antenna substrate,
- wherein the main board is positioned parallel to and overlapping the horizontal antenna substrate, and
- wherein the second antenna is an antenna for millimeter wave (mmWave) transmission and reception.

13. The vehicle of claim 12, wherein a top surface of the housing is at a level equal to or lower than a top surface of the body adjacent to the housing.

14. The vehicle of claim 12,
- wherein the hidden antenna apparatus further comprises:
  - a carrier substrate provided between the main board, and
  - the horizontal antenna substrate,
- wherein the horizontal antenna substrate is in contact with a top surface of the carrier substrate, and
- wherein the carrier substrate is spaced apart from the main board along a first direction.

15. The vehicle of claim 14,
- wherein the hidden antenna apparatus further comprises:
  - a vertical antenna substrate provided on the carrier substrate, and
  - a vertical antenna array mounted on the vertical antenna substrate, and
- wherein the vertical antenna substrate extends in the first direction.

* * * * *